United States Patent
Schwartz

(10) Patent No.: US 9,642,499 B2
(45) Date of Patent: May 9, 2017

(54) BATHTUB INSERT FOR CHILDREN

(75) Inventor: Adam Schwartz, Chicago, IL (US)

(73) Assignee: SAFETY TUBS COMPANY, LLC, Piscataway, NJ (US)

( * ) Notice: Subject to any disclaimer, the term of this patent is extended or adjusted under 35 U.S.C. 154(b) by 86 days.

(21) Appl. No.: 12/847,508

(22) Filed: Jul. 30, 2010

(65) Prior Publication Data

US 2011/0023226 A1    Feb. 3, 2011

Related U.S. Application Data

(60) Provisional application No. 61/229,955, filed on Jul. 30, 2009.

(51) Int. Cl.
*A47K 3/034* (2006.01)
*A01K 13/00* (2006.01)

(52) U.S. Cl.
CPC ............ *A47K 3/034* (2013.01); *A01K 13/001* (2013.01)

(58) Field of Classification Search
CPC . A47K 3/12; A47K 3/122; A47K 3/15; A47K 3/164; A47K 3/162; A47K 3/127; A47K 3/074
USPC .......................... 4/572.1, 586, 587, 548–551
See application file for complete search history.

(56) References Cited

U.S. PATENT DOCUMENTS

| | | | | |
|---|---|---|---|---|
| 1,881,405 A | * | 10/1932 | Haring | 4/551 |
| 1,982,859 A | * | 12/1934 | Derbyshire | 4/551 |
| 2,182,669 A | * | 12/1939 | Kennedy | 4/586 |
| 2,572,463 A | * | 10/1951 | Fine | 4/549 |
| 2,698,948 A | * | 1/1955 | Levitt | 4/551 |
| 2,700,776 A | * | 2/1955 | Walters | 4/572.1 |
| 2,719,306 A | * | 10/1955 | Levitt | 4/551 |
| 3,955,221 A | * | 5/1976 | Finch | 4/539 |
| 5,092,001 A | * | 3/1992 | Ross et al. | 4/572.1 |

(Continued)

FOREIGN PATENT DOCUMENTS

| | | |
|---|---|---|
| JP | 53-049566 U | 4/1978 |
| JP | 2000-051109 A | 2/2000 |

(Continued)

OTHER PUBLICATIONS

PCT International Preliminary Report on Patentability, International Application No. PCT/US2010/043933, Jan. 31, 2012, 5 pages.

(Continued)

*Primary Examiner* — Janie Loeppke
(74) *Attorney, Agent, or Firm* — Morgan, Lewis & Bockius LLP

(57) ABSTRACT

The present invention provides a child bath that can be used either as a stand alone bath or as a conversion unit for conventional bathtubs. The child bath includes a vertical front panel and a horizontal top panel with a wash basin that holds a smaller volume of water than a convention bathtub. A support frame provides structural support to the horizontal and front panels. In one embodiment of the invention, the support frame fits within a conventional bathtub and holds the horizontal panel across the top of the bathtub, while holding the front panel in front of at least a portion of the side of the bathtub. In another embodiment of the invention the support frame holds the horizontal panel higher than the height of a conventional bathtub, thereby allowing an adult to stand next to the tub while bathing a child.

28 Claims, 21 Drawing Sheets

(56) References Cited

U.S. PATENT DOCUMENTS

| | | | | |
|---|---|---|---|---|
| 5,181,284 | A * | 1/1993 | Raphael et al. | 4/572.1 |
| 5,963,993 | A * | 10/1999 | Dunn | 4/572.1 |
| 5,974,601 | A * | 11/1999 | Drane et al. | 4/539 |
| 2004/0139543 | A1* | 7/2004 | Courouzos | 4/572.1 |
| 2005/0091742 | A1* | 5/2005 | Bennett | 4/572.1 |
| 2010/0275364 | A1* | 11/2010 | Torres et al. | 4/555 |

FOREIGN PATENT DOCUMENTS

| | | |
|---|---|---|
| JP | 3152564 U | 7/2009 |
| KR | 20-2000-0017506 U | 9/2000 |

OTHER PUBLICATIONS

PCT International Search Report and Written Opinion, International Application No. PCT/US2010/043933, Apr. 29, 2011, 7 pages.

\* cited by examiner

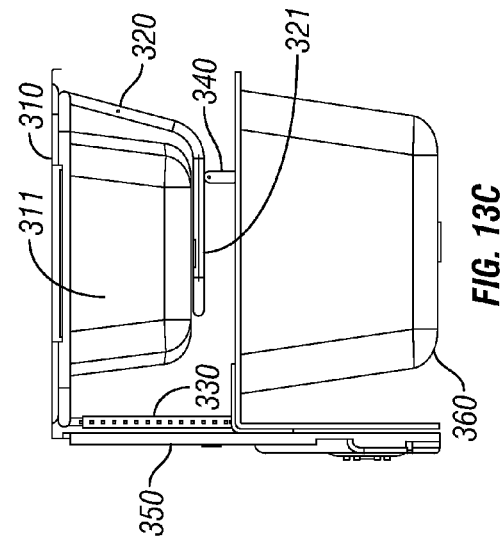
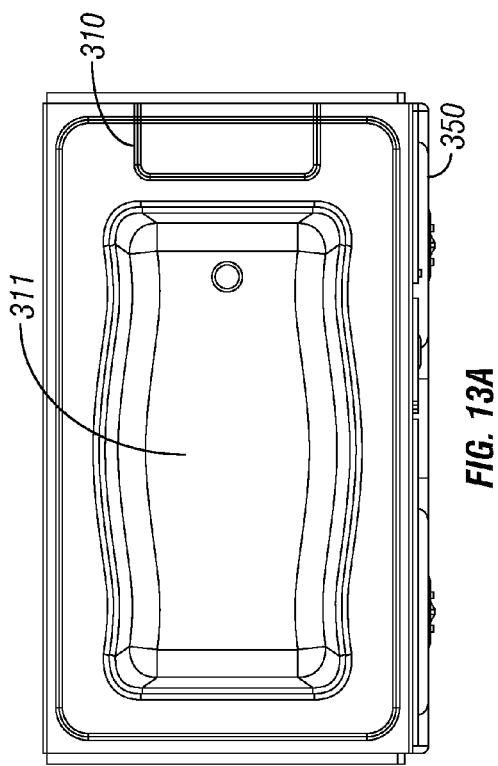
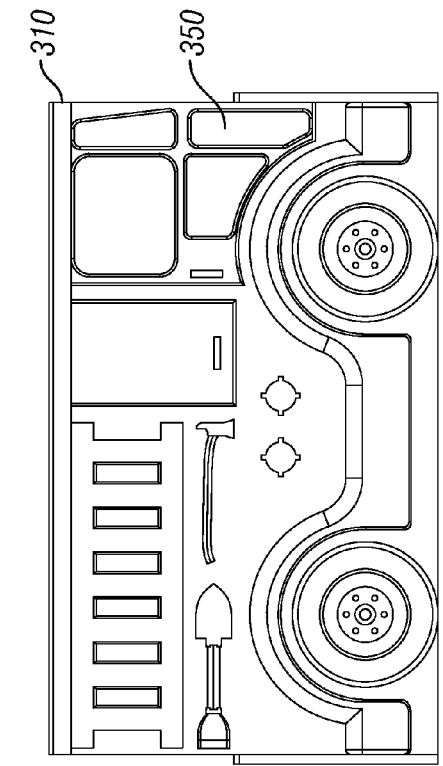

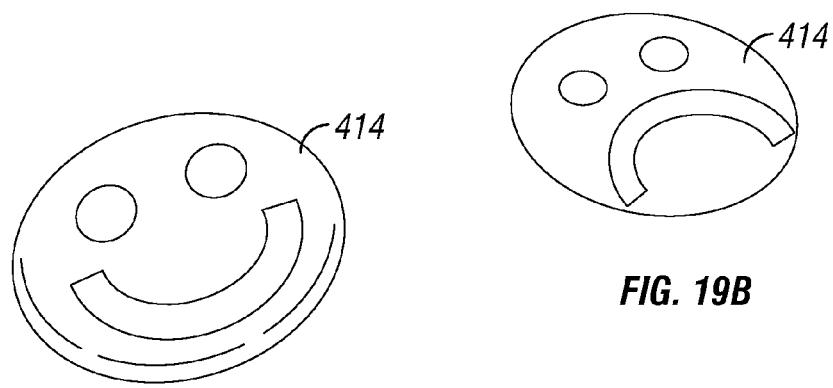
FIG. 19B
FIG. 19A
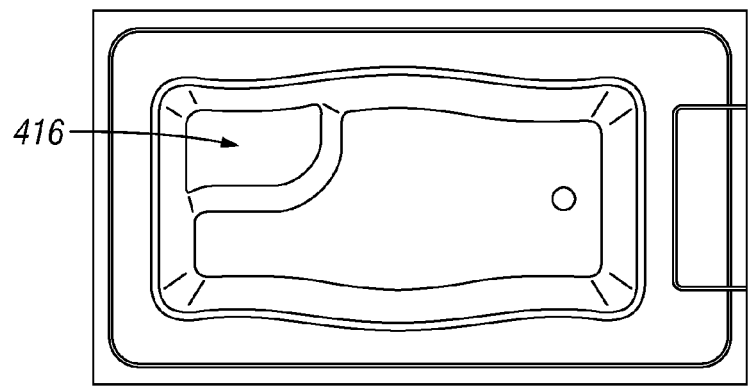
FIG. 20A
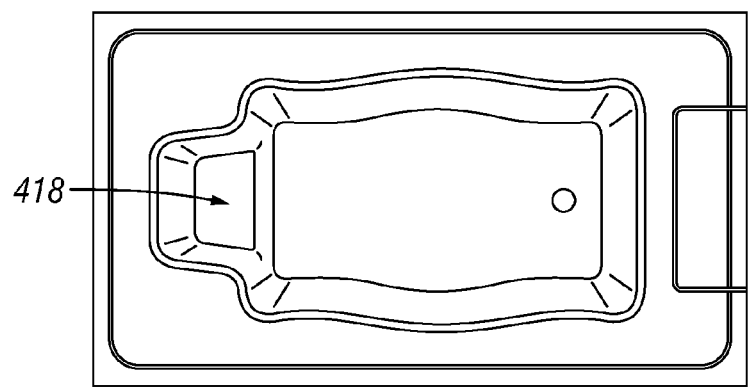
FIG. 20B

BATHTUB INSERT FOR CHILDREN

CROSS-REFERENCE TO RELATED APPLICATIONS

This application claims the benefit of and priority to U.S. Provisional Patent Application No. 61/229,955 filed Jul. 30, 2009, the technical disclosures of which are hereby incorporated herein by reference.

TECHNICAL FIELD

The present invention relates generally to bathtubs and more specifically to an insert that converts a regular bathtub to a tub suitable for bathing infants and children.

BACKGROUND OF THE INVENTION

Traditionally, bathing infants and children is a tricky endeavor that often involves considerable awkwardness for the adult and potential risks for the child. Much of the difficulty stems from the fact that parents often attempt to bath their children in full sized adult bathtubs. This presents two immediate problems. One is the awkward and often uncomfortable position the adult must assume next to the low tub in order to properly handle the child during bathing. The second major problem is the volume of water used. Because of the size of the tub an excessive volume of water is needed to bath the child, even when the water level is kept relatively low. In addition to wasting water, the excessive volume also presents potential safety hazards, especially in the case of infants.

A typically alternative to using a full sized tub is the bathe the child in a large sink such as a kitchen sink. However, this solution presents its own problems including the presence of an extended, moveable faucet that can be potential injurious to the child or at least a considerable annoyance for the adult. Additionally, the kitchen sink is shaped to accommodate dishes, not children and may not provide a working area for bathing.

Therefore, it would be desirable to have an apparatus that adapts a traditional bathtub for more suitable use for bathing small children.

SUMMARY OF THE INVENTION

The present invention provides a child bath that can be used either as a stand alone bath or as a conversion unit for converting a conventional bathtub in to a modified tub for bathing small children. The child bath includes a vertical front panel and a horizontal top panel with a wash basin that holds a smaller volume of water than a convention bathtub. A support frame provides structural support to the horizontal and front panels. In one embodiment of the invention, the support frame fits within a conventional bathtub and holds the horizontal panel across the top of the bathtub, while holding the front panel in front of at least a portion of the side of the bathtub. In another embodiment of the invention the support frame holds the horizontal panel higher than the height of a conventional bathtub, thereby allowing an adult to stand next to the tub while bathing a child. In another embodiment of the invention, the front panel has a decorative design that simulates the side of a vehicle such as a fire engine or racing car.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 13A shows a top plan view of the assembled conversion unit;

FIG. 13B shows a side plan view of the assembled conversion unit;

FIG. 13C shows an end on view of the assembled conversion unit;

FIGS. 19A and 19B show an optional temperature indicator that changes appearance to indicate whether the water temperature is within a suitable range for bathing infants or small children;

FIGS. 20A and 20B show example ergonomic profiles that may be used in the insert basin;

DETAILED DESCRIPTION

Figure 1:
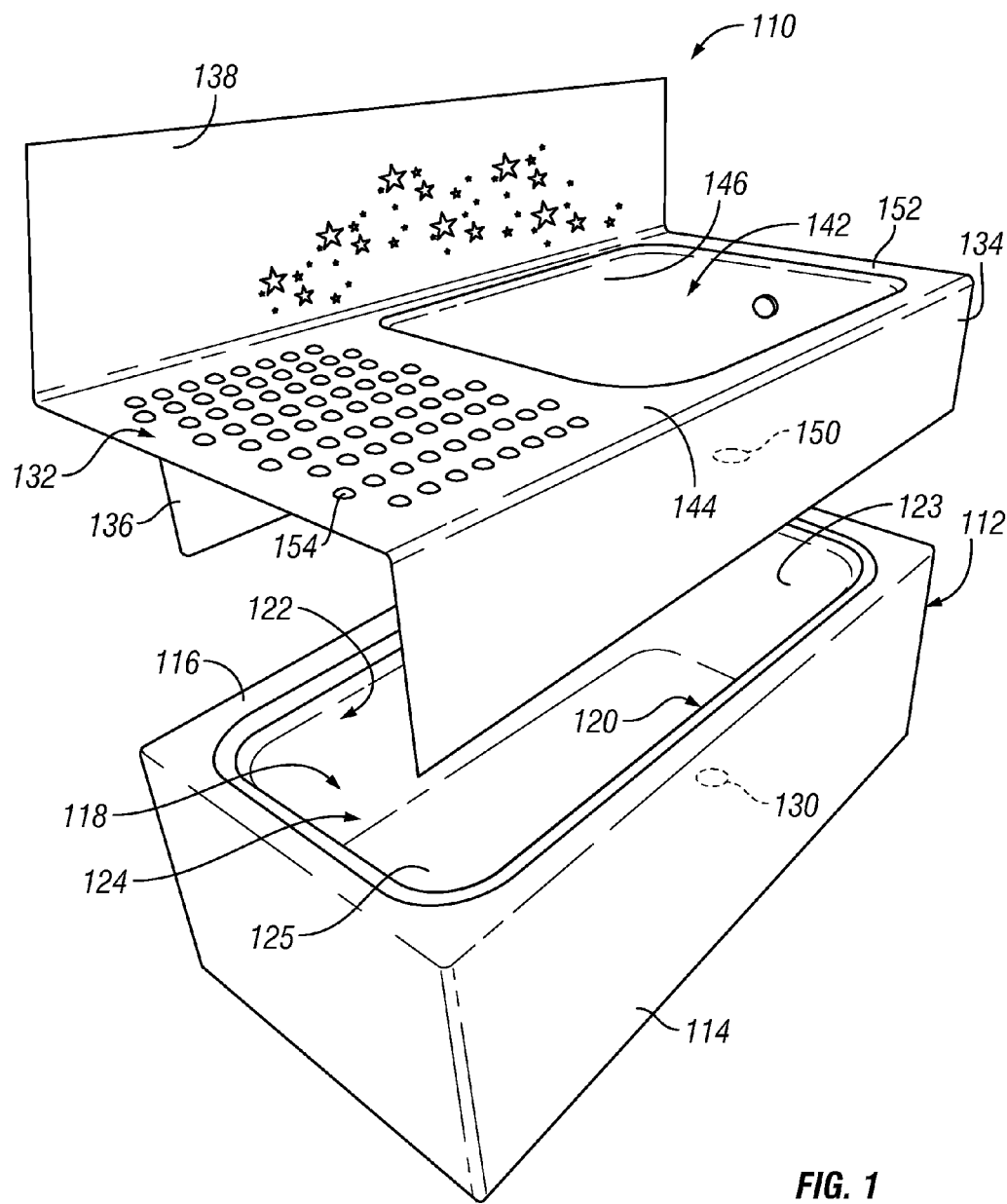
FIG. 1 shows an exploded view of the bathtub conversion unit relative to a conventional bathtub in accordance with the present invention.

FIG. 1 shows an exploded view of the bathtub conversion unit in accordance with the present invention. The bathtub conversion unit 110 of the present invention is installed on a conventional bathtub 112 that includes generally vertical front 114 and rear 116 exterior walls and a bathtub basin 118 defined by generally vertical or steeply sloped front 120 and rear 122 interior walls, a head wall 123, a foot wall 124, and a bathtub floor 125. The bathtub 112 preferably includes a faucet 126 and/or a showerhead 128 (shown in FIG. 2) and a drain (not shown).

In one embodiment, the bathtub conversion unit 110 fits over the conventional bathtub 112 as show in FIG. 1. The conversion unit 110 is a temporary installation that partially covers the bathtub 112, providing a more convenient device for bathing infants or small children than a conventional bathtub and with a reduced volume of water. The conversion unit 110 can be molded as an integral unit and includes a horizontal main panel 132, a front panel 134, a rear support panel 136, and a vertical back panel or backsplash 138. The corresponding edges of the adjoining panels can be radiused to avoid sharp edges.

Figure 2:
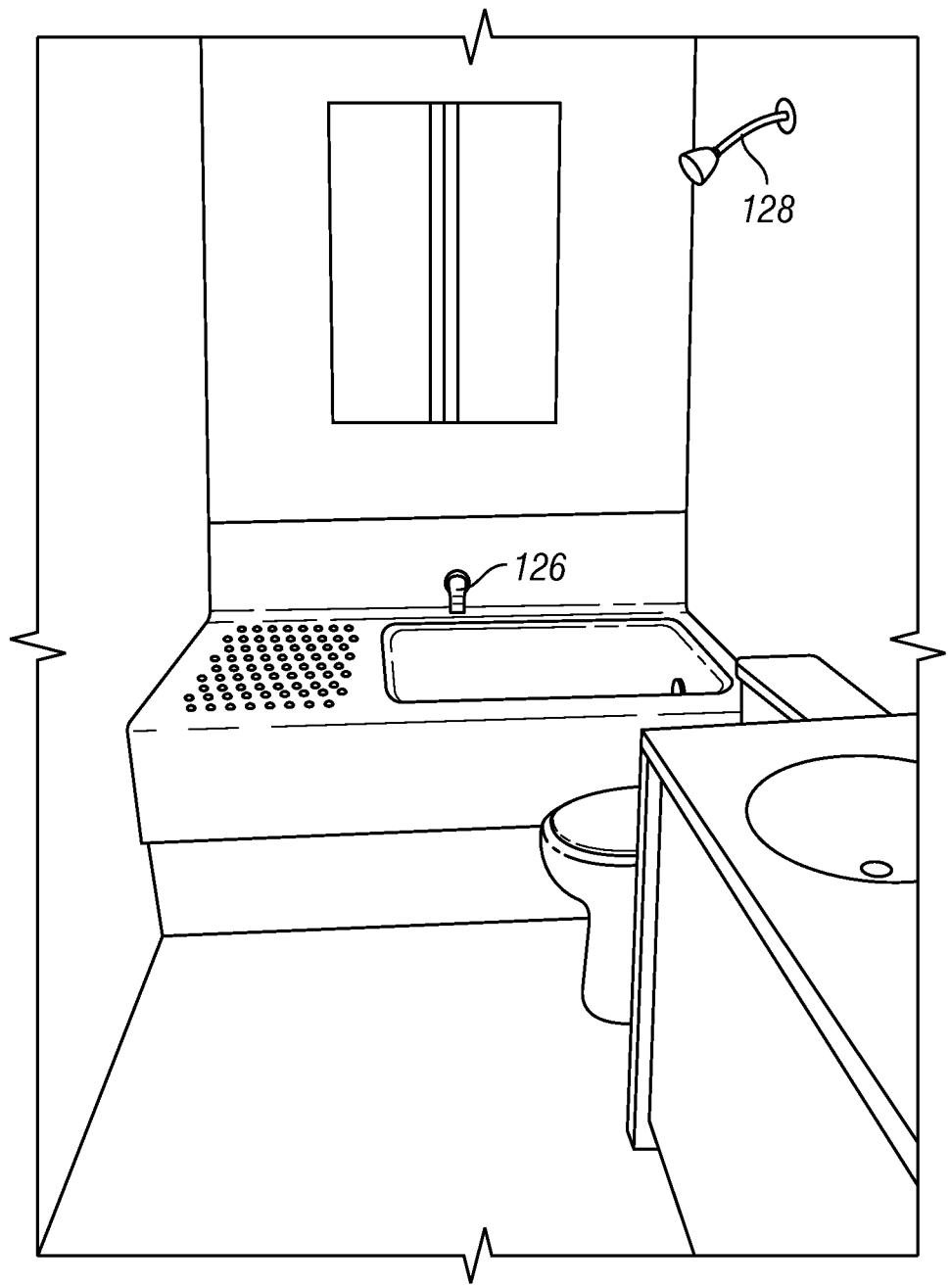
FIG. 2 shows a bathtub conversion unit installed in a conventional bath that has a faucet and showerhead.
Figure 3:
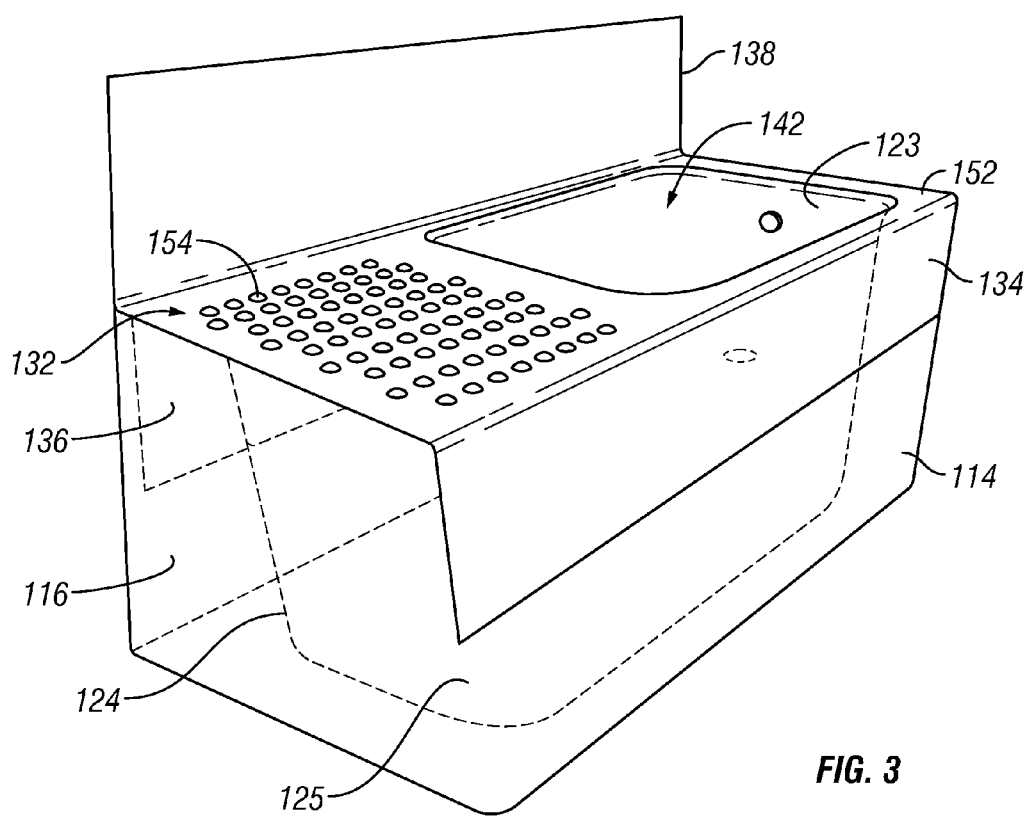
FIG. 3 is a perspective see through view showing the bathtub conversion unit inserted into a conventional bathtub in accordance with the present invention.

When the conversion unit 110 is installed on the bathtub 112, the front panel 134 fits over the front exterior bathtub wall 114 (as shown in FIGS. 2 and 3), and the rear support panel 136 abuts the rear interior bathtub wall 122. In some cases, the rear panel 136 is placed against the rear exterior wall 116. Gripping devices, such as rubber grips, adhesives or caulking are optionally provided between the front panel 134 and the front exterior bathtub wall 114 and between the rear support panel 136 and the rear interior bathtub wall 122, thereby holding the conversion unit in place on top of the conventional bathtub.

The main horizontal panel 132 of the conversion unit includes a wash basin 142 and an upper surface 144. The basin 142 is configured to hold bathwater and includes sidewalls 146 and a bottom surface with a drain 150 (shown hidden). The insert basin 142 can be configured to hold the same volume of water as the tub basin 118, but typically for most applications, the insert basin 142 is shallower than the tub basin 118 and holds a significantly smaller volume of water. This smaller volume makes it more convenient and safer for bathing infants and small children and also saves water. A lip portion 152 of the main panel 132 surrounds the basin. Grip-enhancing formations 154 such as ridges, bumps or dimples can be provided to reduce the slipperiness of the upper surface 144 of the insert. Such grip-enhancing formations may also be provided on the floor of the insert's basin 142. Water is introduced into the insert's basin 142 using the faucet or the showerhead, and drainage from the conversion unit's drain 50 simply flows into the bathtub basin 118 and drain 130.

The back panel or backsplash 138 substantially prevents water that may be splashed from the recess from damaging any wall or surface behind the conversion unit. In addition, the back panel provides a surface where graphics may be affixed for the entertainment of a child. Optionally, the backsplash may be adapted for use as a dry erase board.

Figure 4:
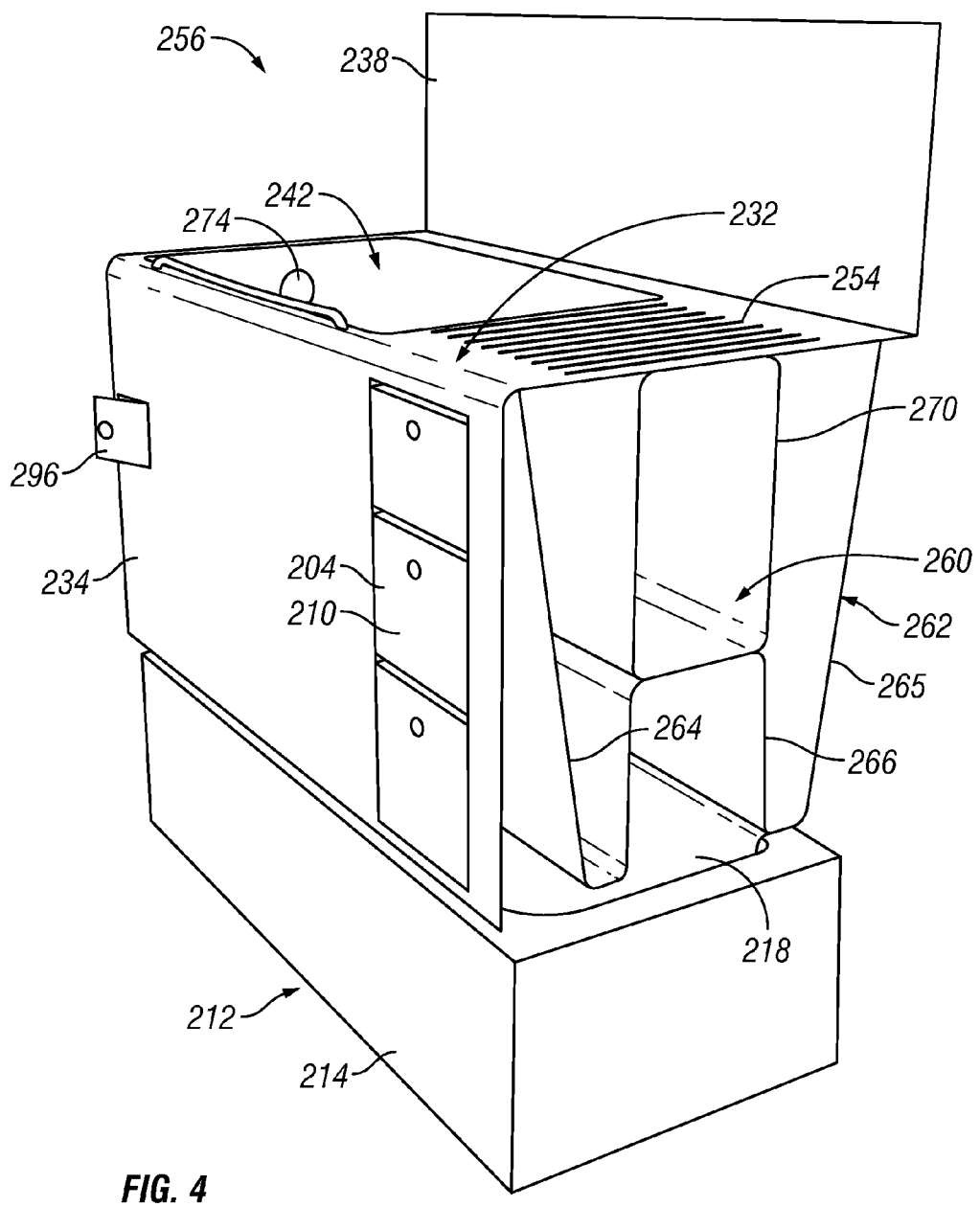
FIG. 4 shows an alternate embodiment of the present invention in which the conversion unit is a semi-permanent installation, which completely covers the conventional bathtub.

FIG. 4 shows an alternate embodiment of the present invention in which the conversion unit is a semi-permanent installation, which completely covers the conventional bathtub. This embodiment raises the height of the horizontal panel 232 and wash basin 242 higher than the bathtub 212 so that an adult can stand next to the tub while bathing the child, thereby saving the adult from having to kneel or sit on the floor next to the bathtub. In addition to increasing convenience and ease of use of the invention, the standing posture improves the comfort of the adult and allows the adult to maintain normal posture and optimal body position for bathing and controlling a child in the basin 242, thereby improving child safety as well.

The conversion unit 256 in this embodiment includes a horizontal main panel 232, a front panel 234, a vertical back panel or backsplash 238, and an optional understructure (support frame) 260. The understructure 260 is designed to provide structural support to the insert, particularly the main panel 232 and front panel 234.

As shown in FIG. 4, the understructure 260 includes a first support member 262 that forms an approximate "W" shape when viewed from the side and includes two larger walls 264, 265 and a rectangular arch 266 between the walls. The configuration of the support member 262 may differ depending on the configuration of the main panel 232, especially with reference to the size and depth of the basin 242. In one embodiment, the support arch 266 is molded with the front and rear support walls 264, 265 as an integral unit. The support arch 266 extends the length of the conversion unit. A support box 270 may be provided that rests upon the support arch 266 and abuts the main panel 232, extending the length of the conversion unit not occupied by the basin 242.

When the conversion unit 256 is installed, the understructure 260 is disposed within the basin 218 of the convention bathtub 212. The front support wall 264 rests on the front interior wall of the tub well 218, and the rear support wall 265 rests on the rear interior wall. Bottom edges of the support arch 266 rest on the bathtub floor. The front panel 234 fits over the front exterior wall 214 of the bathtub. Gripping devices, such as rubber grips, caulk, or adhesive may be provided to secure the conversion unit 256 in place when installed.

The structure of the main panel 232 is generally the same as that of the first embodiment shown in FIG. 1. Additionally, an overflow drain 274 is located near the top of one of the sidewalls of the insert basin 242. The drain (not shown) of the insert basin 242 is connected to the bathtub drain by tubing 276 (shown in FIG. 5), and the overflow drain 274 is also connected to the bathtub drain by tubing 278.

Figure 6:
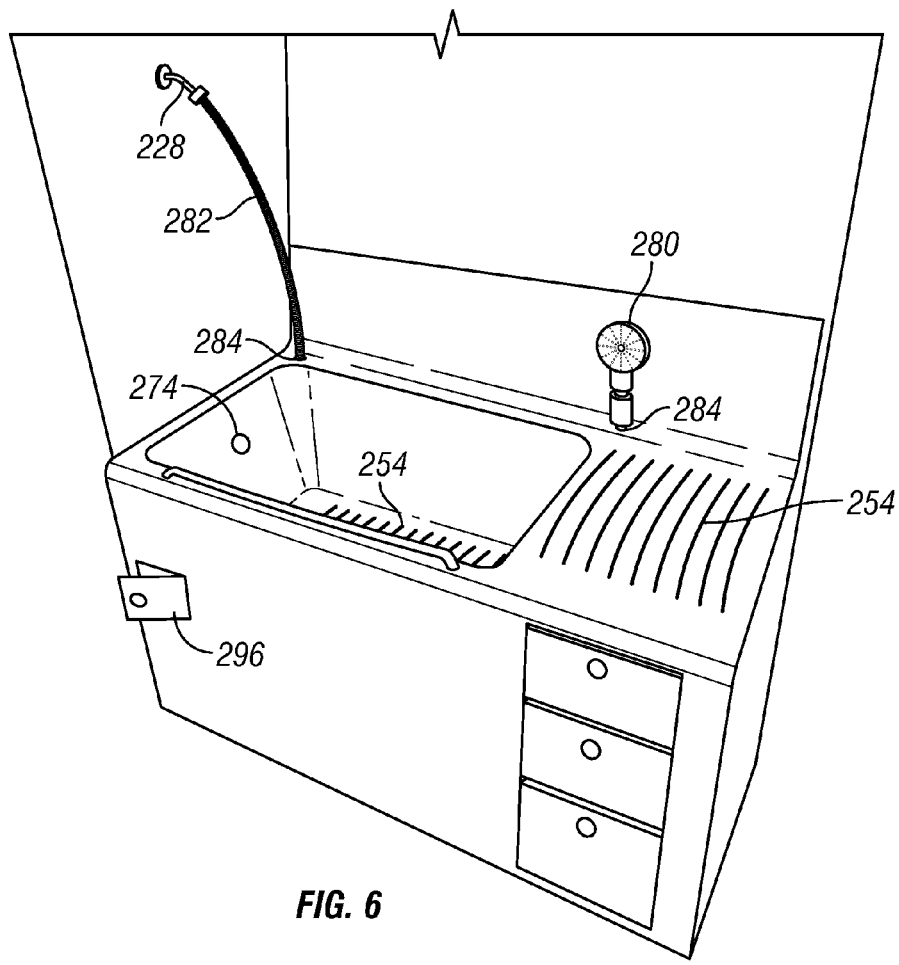
FIG. 6 illustrates several configurations for providing water to the installed conversion insert in accordance with the present invention.
Figure 7:
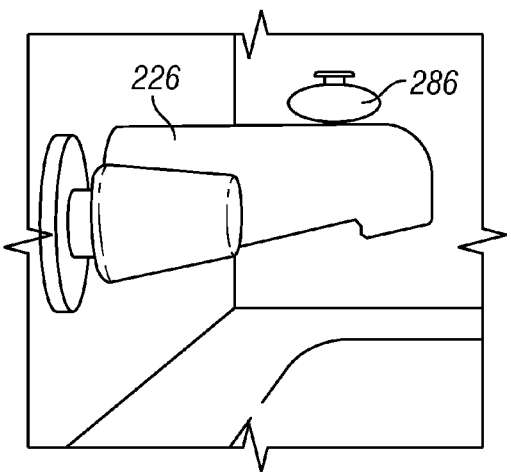
FIG. 7 shows an optional plug that keeps the shower on, so that water always goes through the showerhead instead of the faucet.

FIG. 6 illustrates several configurations for providing water to the installed conversion insert. In one embodiment, a hand shower accessory 280 is provided that can be connected to the showerhead 228 buy a hose 282. The hose 282 may be threaded through a hole 284 in the main panel. As shown in FIG. 7, if water is being drawn from the showerhead 228, an optional plug 286 may be provided to keep the shower on, so that water always goes through the showerhead instead of the faucet 226 which is underneath the insert.

Figure 8:
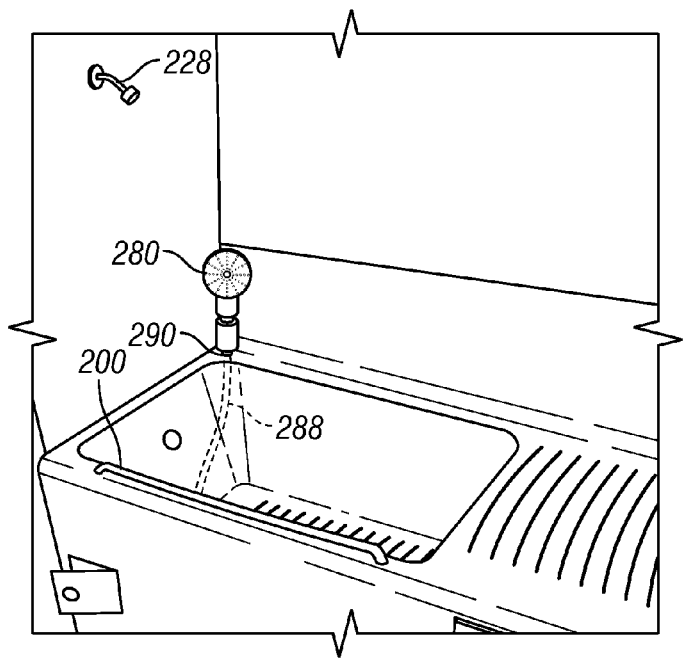
FIG. 8 shows a hand shower accessory that is connected to the tub faucet by a hose threaded through a hole in the main panel of the conversion insert.

In another embodiment shown in FIG. 8, the hand shower accessory 280 is connected to the tub faucet 226 (shown in FIG. 7) by a hose 288 that is threaded through a hole 290 in the main panel.

Figure 9:
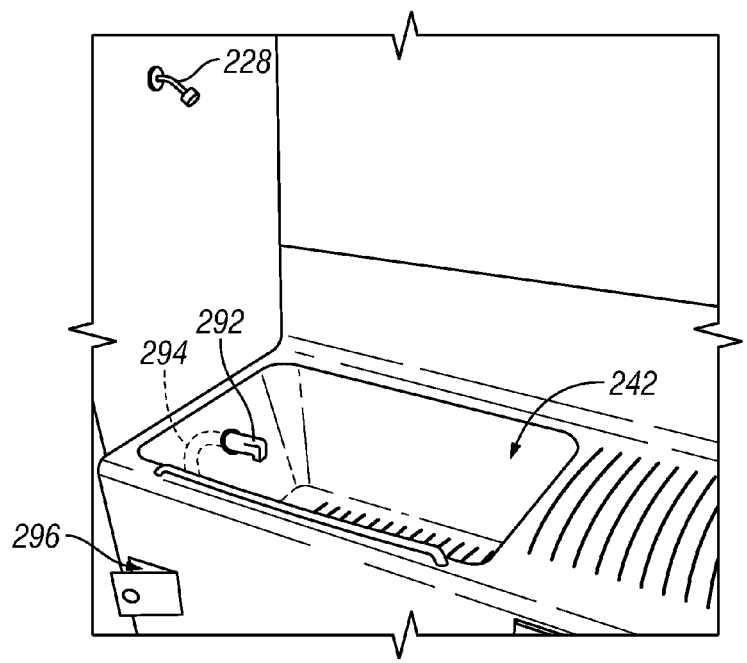
FIG. 9 shows an embodiment of the present invention in which a plastic faucet in the sidewall of the insert basin is connected to the bathtub faucet.

FIG. 9 shows another embodiment of the present invention in which a plastic faucet 292 is provided on one of the sidewalls of the insert basin 242. The plastic faucet 292 is connected to the bathtub faucet 226 by a hose 294. A faucet access door 296 is provided on the front panel of the insert which allows the user to access the bathtub faucet 226 when the insert 256 is installed.

Figure 10A:
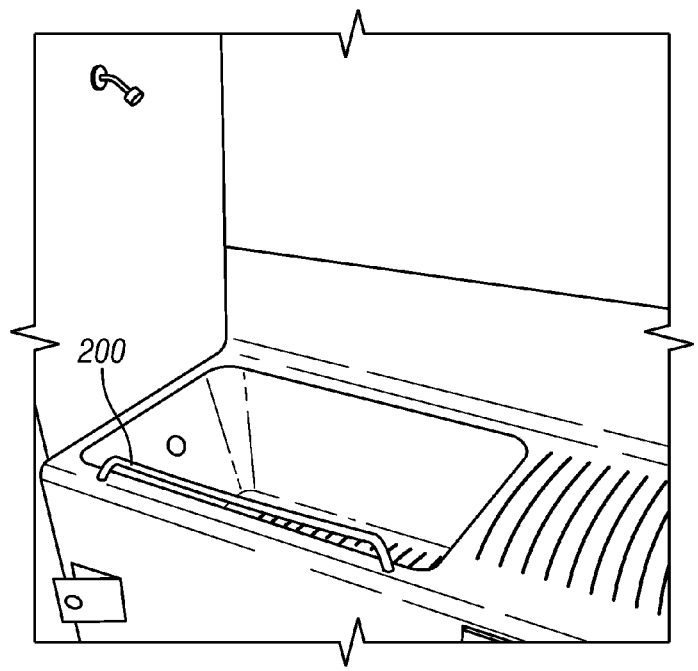
FIGS. 10A and 10B show a retractable handle may be provided on the upper surface of the main panel for all embodiments of the present invention.
Figure 10B:
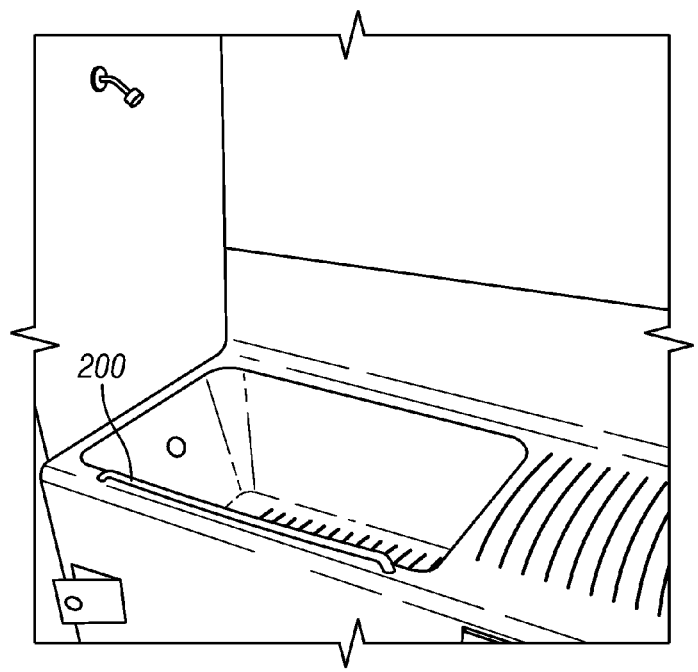

FIGS. 10A and 10B show a retractable handle 200 may be provided on the upper surface of the main panel for all embodiments of the present invention. The handle 200 is movable between an extended, upright position (shown in FIG. 10A) and a retracted position (shown in FIG. 10B). When the handle 200 is in the extended position, a locking mechanism (not shown) locks it into place.

Figure 11:
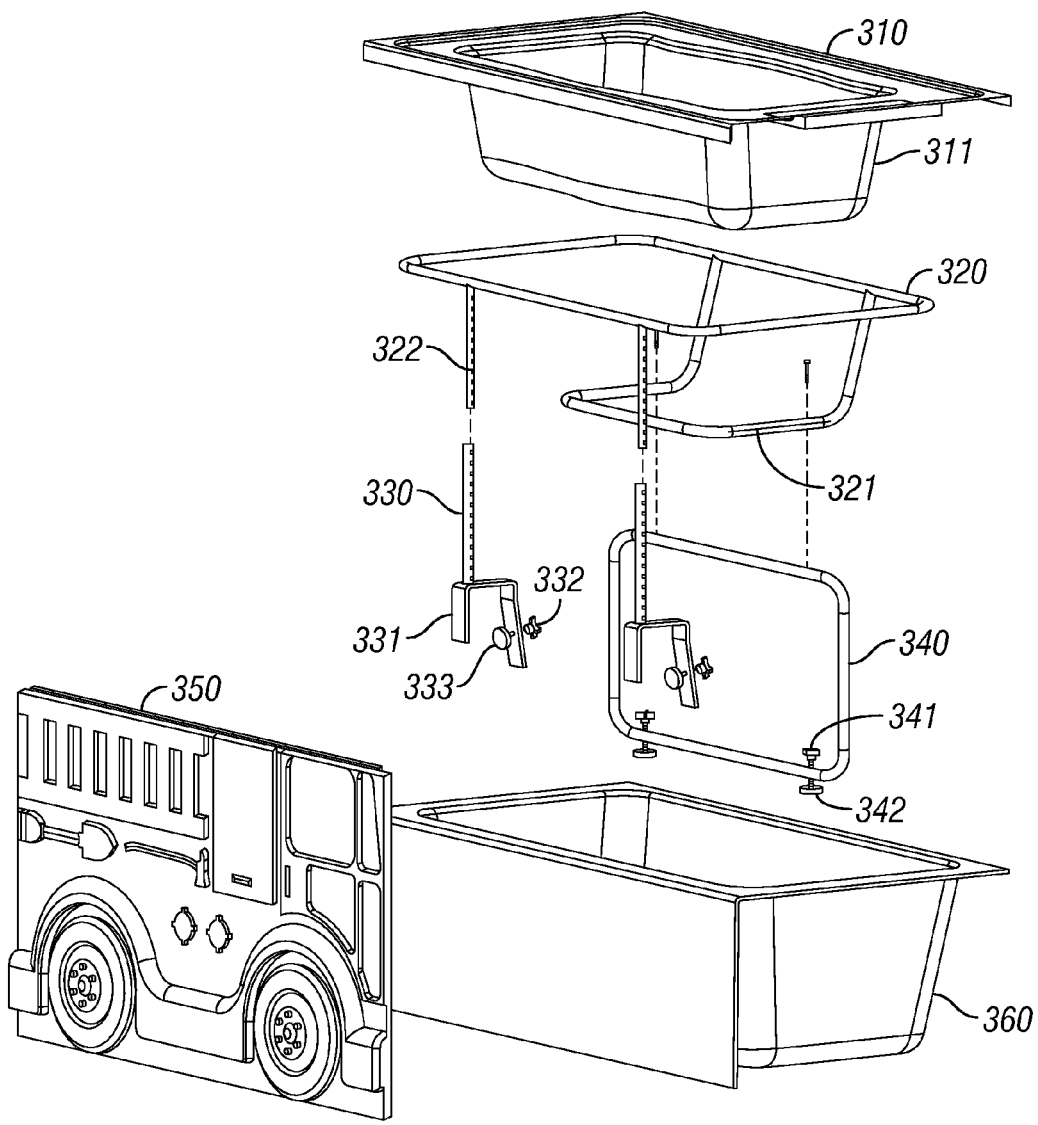
FIG. 11 shows an exploded perspective view of an alternate embodiment of the present invention that uses a tubing support frame.

FIG. 11 shows an exploded perspective view of an alternate embodiment of the present invention that uses a tubing support frame. This embodiment is also a semi-permanent installation. As shown in the figure, the support frame comprises two major components 320, 340. The top section 320 of the support frame is shaped to accommodate the insert 310. A support arm 321 extends downward and inward from the upper frame 320 to provide direct mechanical support under the wash basin 311 of the insert (shown more clearly in FIG. 13C).

The lower frame section 340 sits in the basin of the conventional bathtub 360 and holds the upper frame 320 and insert 310 above the bath. The lower frame 340 has adjustable knobs 341 to fine tune the height of the support frame. The knobs 341 are attached to leveling feet 342 that may have rubberized and/or gripping surfaces to both prevent the frame from moving as well as protect the surface of the tub from scratches. In one embodiment, the leveling feet 342 are adjustable by six inches.

Support of the front side of the upper frame section 320 is provided by adjustable push button tubing 322 that mates within corresponding receiving tubes 330. The bottoms of the receiving tubes 330 have roughly U shaped brackets 331 that fit over the front wall of the bathtub 360. The brackets 331 include adjustable knobs 332 to fine tune the fit of the brackets to the tub wall, ensuring a secure fit. The knobs 332 also have feet with rubberized and/or gripping surfaces to both prevent the frame from moving.

The adjustable leveling feet 342 and push button tubing 322 allow the height of the support frame to be adjusted to accommodate different tubs and different sized front panels.

The front panel 350 of the conversion unit covers the front of the tub 360 and hides the support frame under the horizontal panel 310. In the specific example shown in FIG. 11, the front panel 350 is designed to resemble the side of a fire truck. Similar types of designs such as for example racing cars or bulldozers might be used for the child's amusement (and hopefully that of the adult as well).

Figure 12:
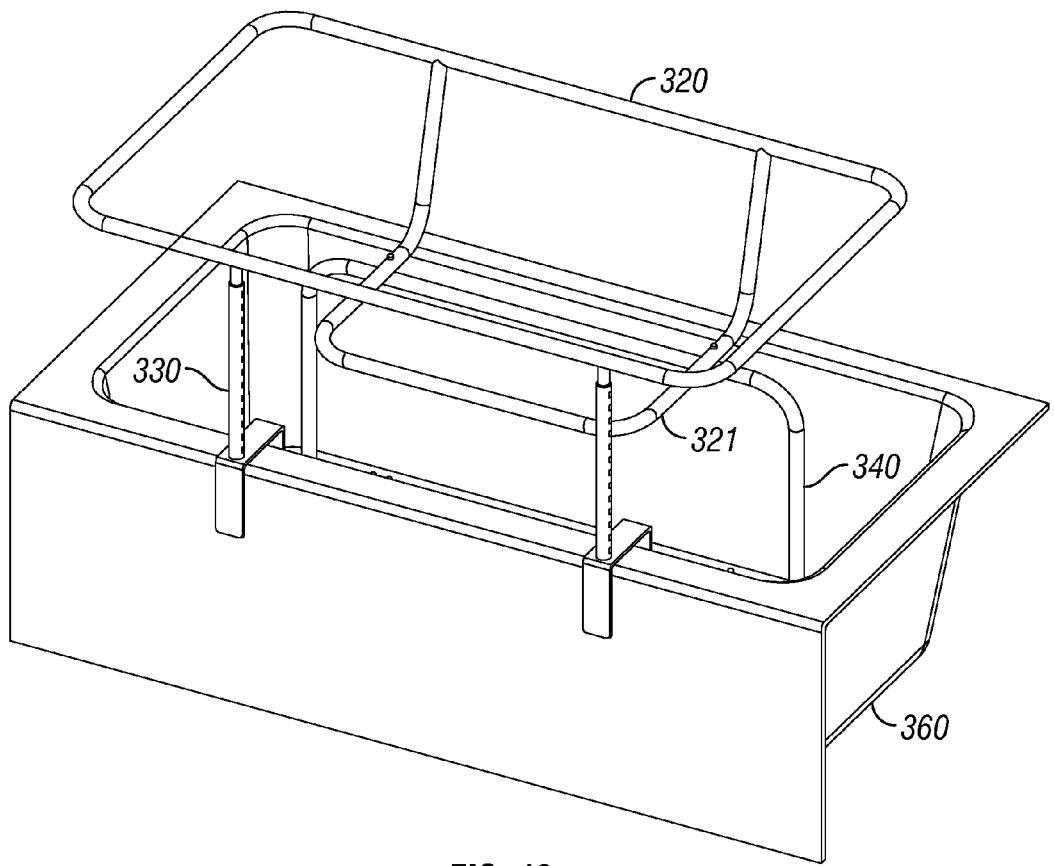
FIG. 12 shows a perspective view of the assembled support frame in the bathtub without the insert and front panel.

FIG. 12 shows a perspective view of the assembled support frame in the bathtub without the insert and front panel.

FIG. 13A shows a top plan view of the assembled conversion unit, and FIG. 13B shows a side plan view of the assembled conversion unit. FIG. 13C shows an end on view of the assembled conversion unit which more clearly illustrates how the support frame sections 320, 330, 340 support the insert 310 above the tub 360.

Figure 14A:
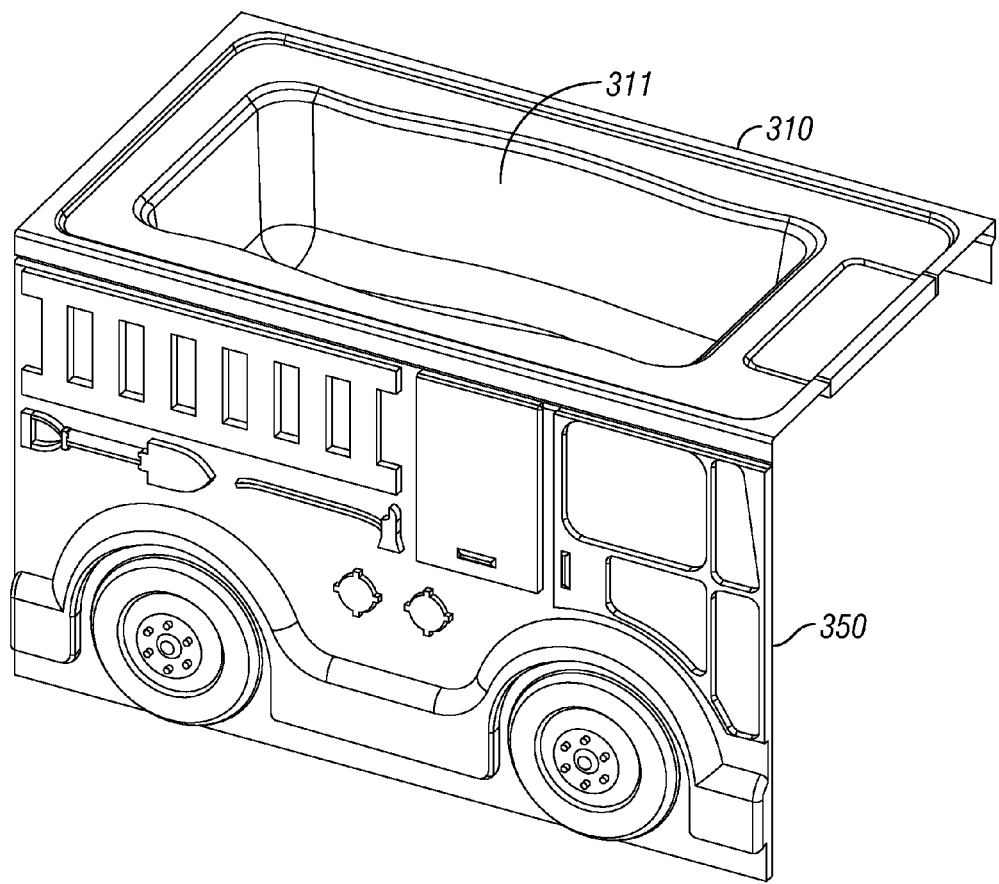
FIG. 14A is a perspective view of the assembled insert and front panel.
Figure 14B:
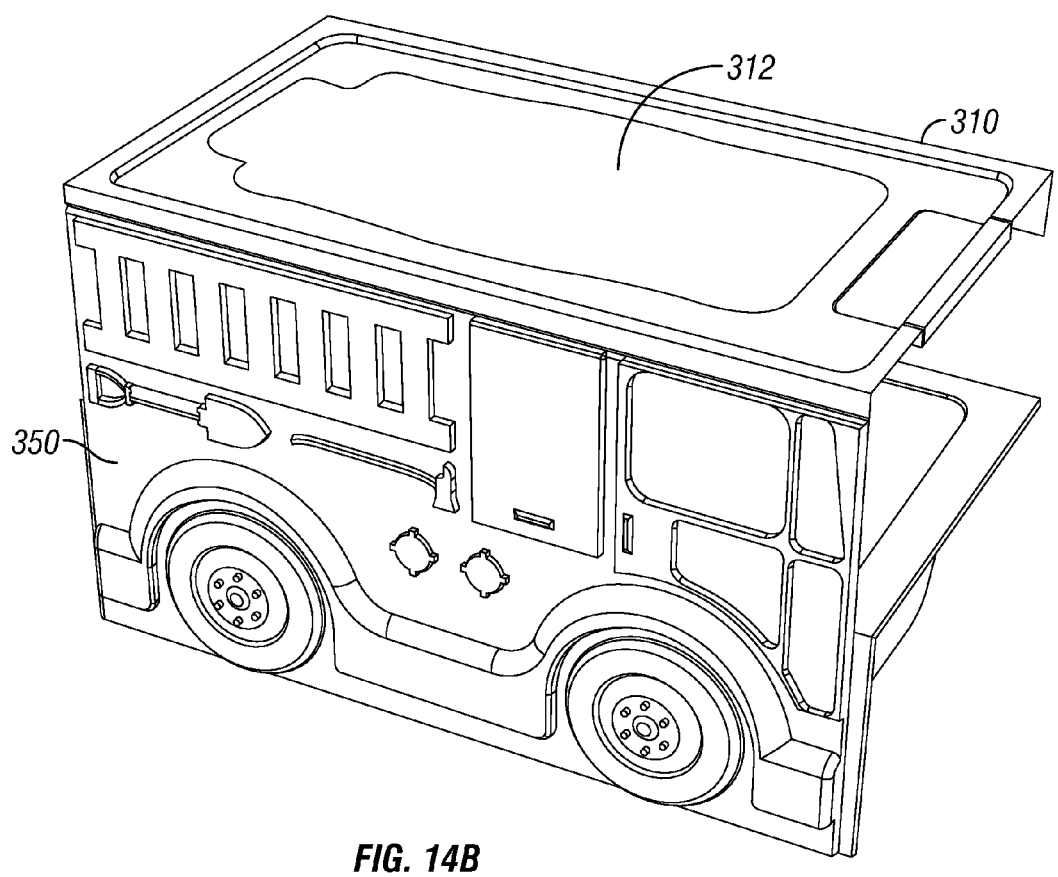
FIG. 14B shows an optional cover that can be used to cover the basin of the insert when not in use.

FIG. 14A is a perspective view of the assembled insert 310 and front panel 350. In this view, the basin 311 of the horizontal panel 310 is open. FIG. 14B shows an optional cover 312 that can be used to cover the basin of the insert when not in use, thereby turning the top surface of the horizontal panel 310 into a useable table.

Figure 15A:
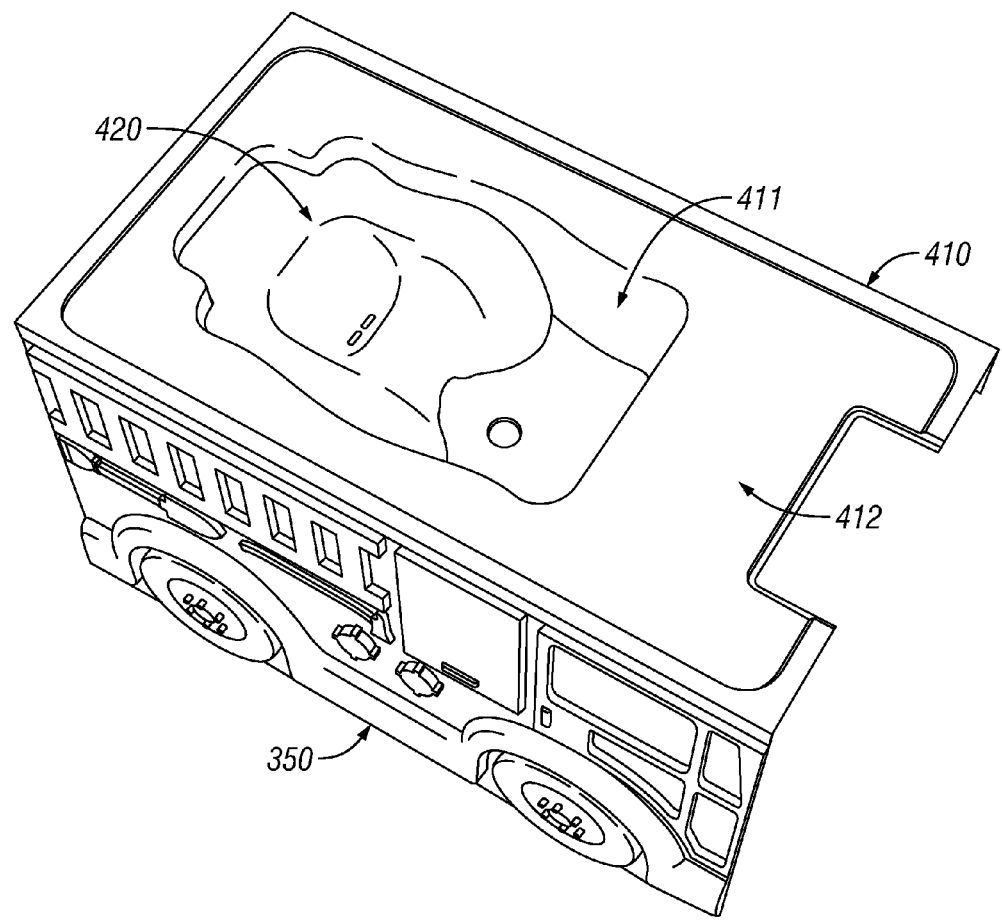
FIG. 15A a conversion unit with an alternate horizontal panel that has a smaller wash basin than the basin shown in FIG. 14 and a removable foam seat back for use with newborns or less mobile children.

FIG. 15A shows a conversion unit with an alternate horizontal panel 410 that has a smaller wash basin 411 than the basin 311 shown in FIG. 14. Also shown in the figure is a removable foam seat back 420 that can be placed in the basin 411 for use with newborns or less mobile children. The foam seat back 420 can of course be used with any of the embodiments of the tub insert.

Figure 15B:
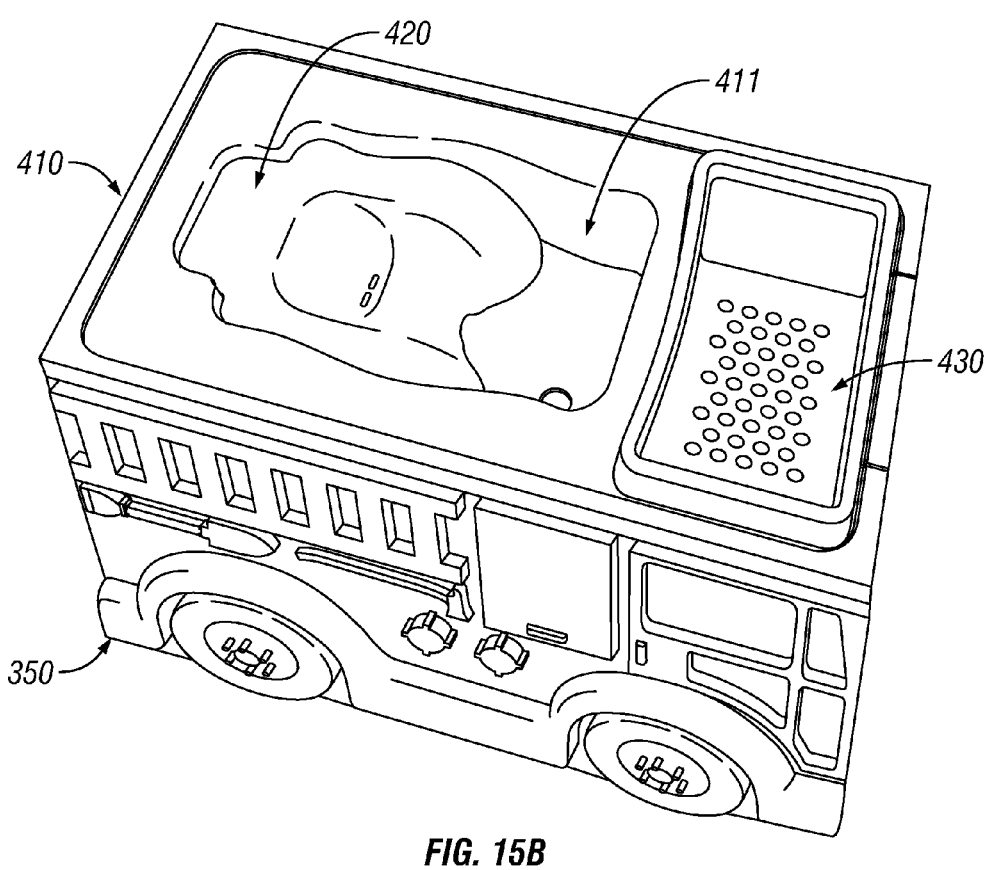
FIG. 15B shows a removable diaper changing pad on the top surface of the horizontal panel of the conversion unit.

As a consequence of the smaller basin 411 in FIG. 15A, there is a larger work area 412 on the horizontal panel 410. This work area may accommodate a removable, cushioned diaper changing pad 430 as show in FIG. 15B.

Figure 16:
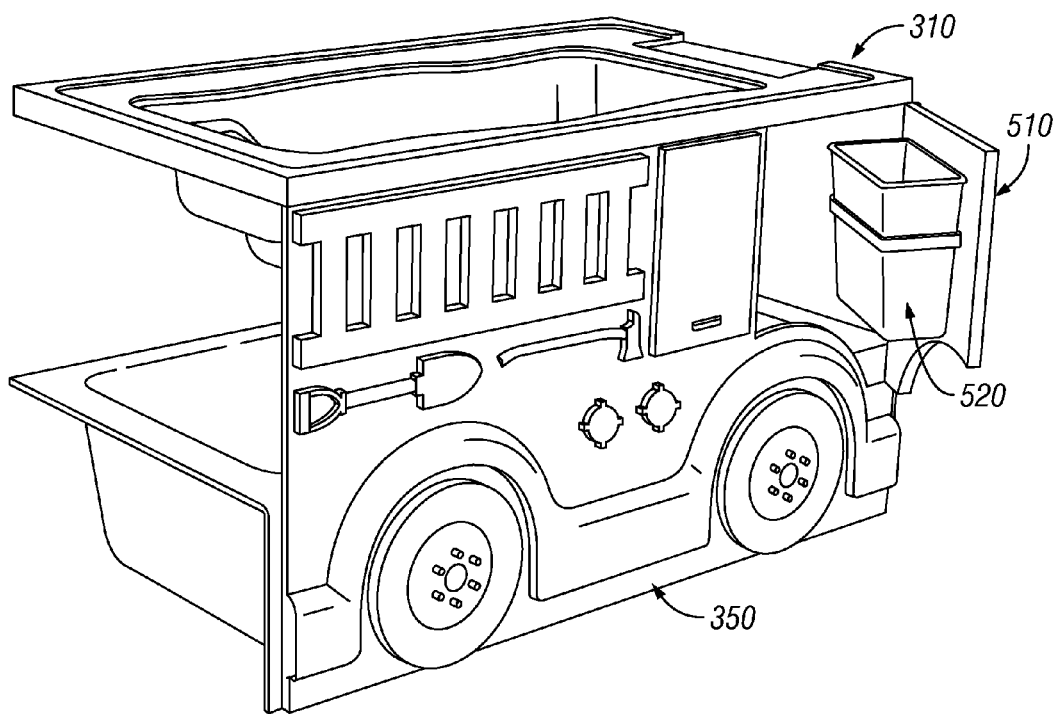
FIG. 16 shows an optional diaper trash bin incorporated into the front panel of the conversion unit.

FIG. 16 shows an optional diaper trash bin incorporated into the front panel of the conversion unit. The diaper/waste disposal bin 520 is secured to a swinging door panel 510 mounted on the front panel 350 of the conversion unit. The swinging door 510 allows the diaper bin 520 to be hidden away when not in use.

Figure 17A:
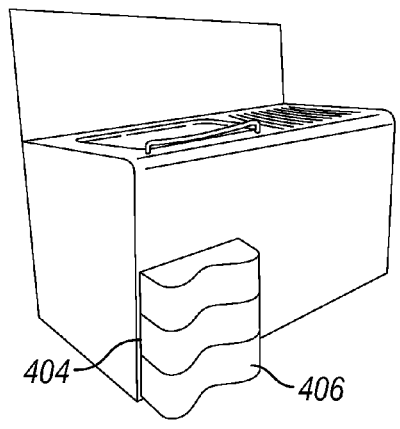
FIGS. 17A and 17B show an embodiment of the present invention in which a set of stairs includes a plurality of slidably retractable blocks of varying depth.
Figure 17B:
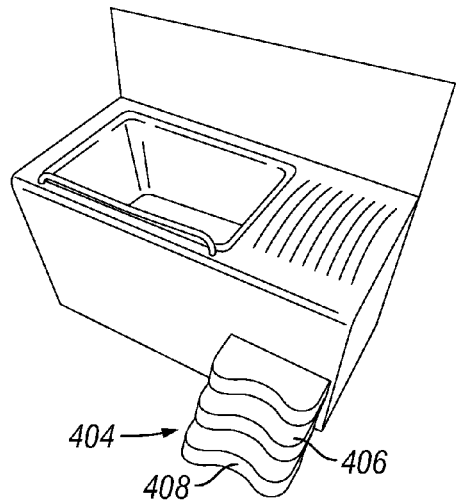

Another optional feature of the invention is a set of stairs provided to allow easier access into the tub insert for small children. FIGS. 17A and 17B show an embodiment of the present invention in which a set of stairs 404 includes a plurality of slidably retractable blocks 406 of varying depth stacked in order of depth with the shallowest block on top to form a set of stairs. Each block has a similarly shaped front profile 408.

Figure 18A:
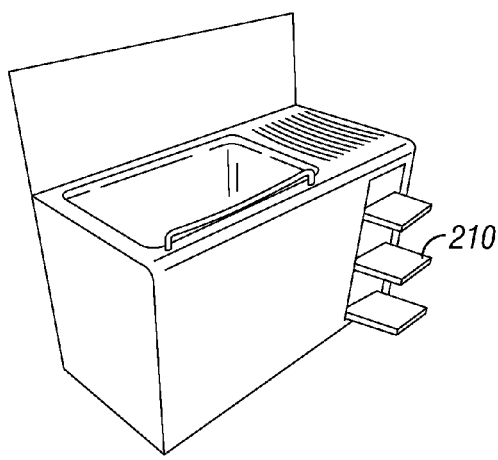
FIGS. 18A and 18B show alternate embodiment in which the stairs comprise a plurality of pivotable panels that fold down about a horizontal axis.
Figure 18B:
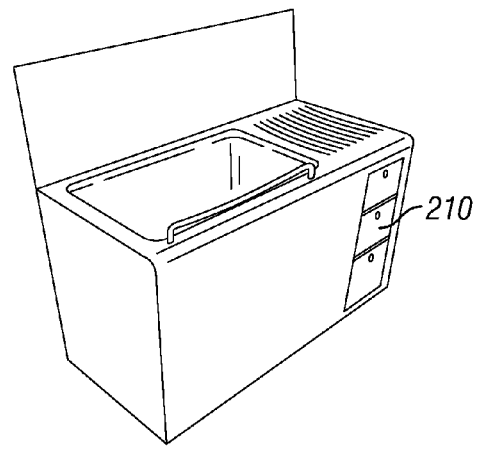

FIGS. 18A and 18B show alternate embodiment of stairs. In this embodiment, the stairs comprise a plurality of pivotable panels 210 that fold down about a horizontal axis. In the extended position, the panels 210 form a set of stairs. The panels are foldable into a storage recess on the front panel so that the stairs do not increase the footprint of the bathtub conversion unit while in the retracted position.

FIGS. 19A and 19B show a temperature indicator may be provided on the insert. The temperature indicator 414 changes color or appearance to indicate whether the water temperature is within a suitable range for bathing infants or small children.

Additional options of the conversion unit of the present invention include providing variable molded profiles for the insert wash basin.

FIGS. 20A and 20B show two example ergonomic profiles that may be used in the insert basin. In the examples depicted in FIGS. 20A and 20B, each profile incorporates a seat 416, 418 molded into the wash basin. As shown in the figures, the first molded seat 416 is located off centered at one end of the basin, while the other molded seat 418 is centered at one end. Other examples of different profiles include incorporating a shampoo/soap shelf as well as varying the length and depth of the wash basin.

Figure 21:
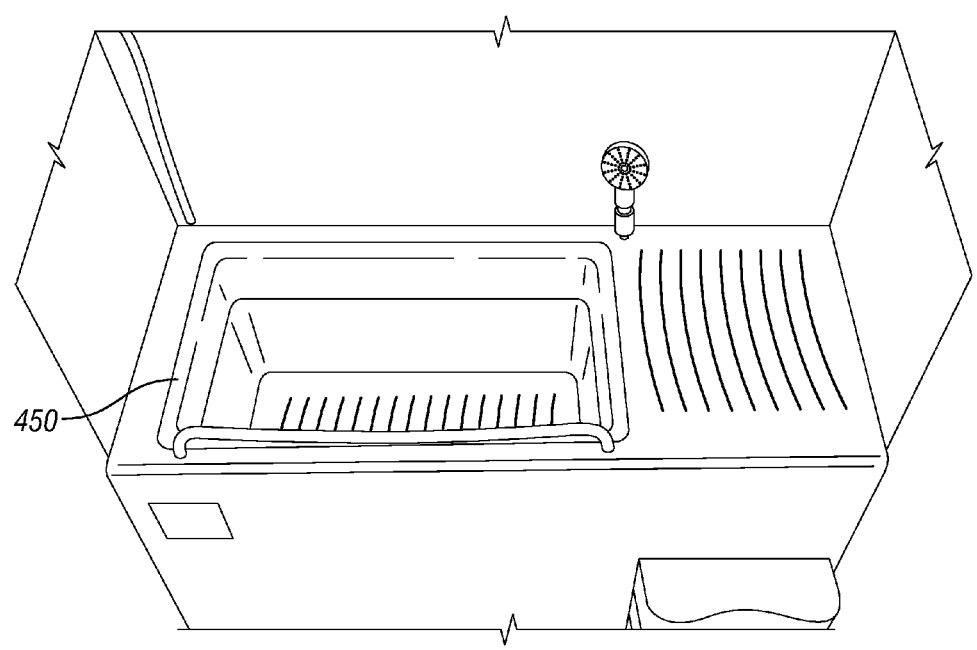
FIG. 21 shows an optional bumper that may be provided along the upper edges of the insert basin, just below the lip portion.

FIG. 21 shows an optional bumper 420 that may be provided along the upper edges of the insert basin, just below the lip portion. The bumper 420 provides soft edges around the lip and prevents a bathing child from making contact with the hard edges of the basin.

Figure 22:
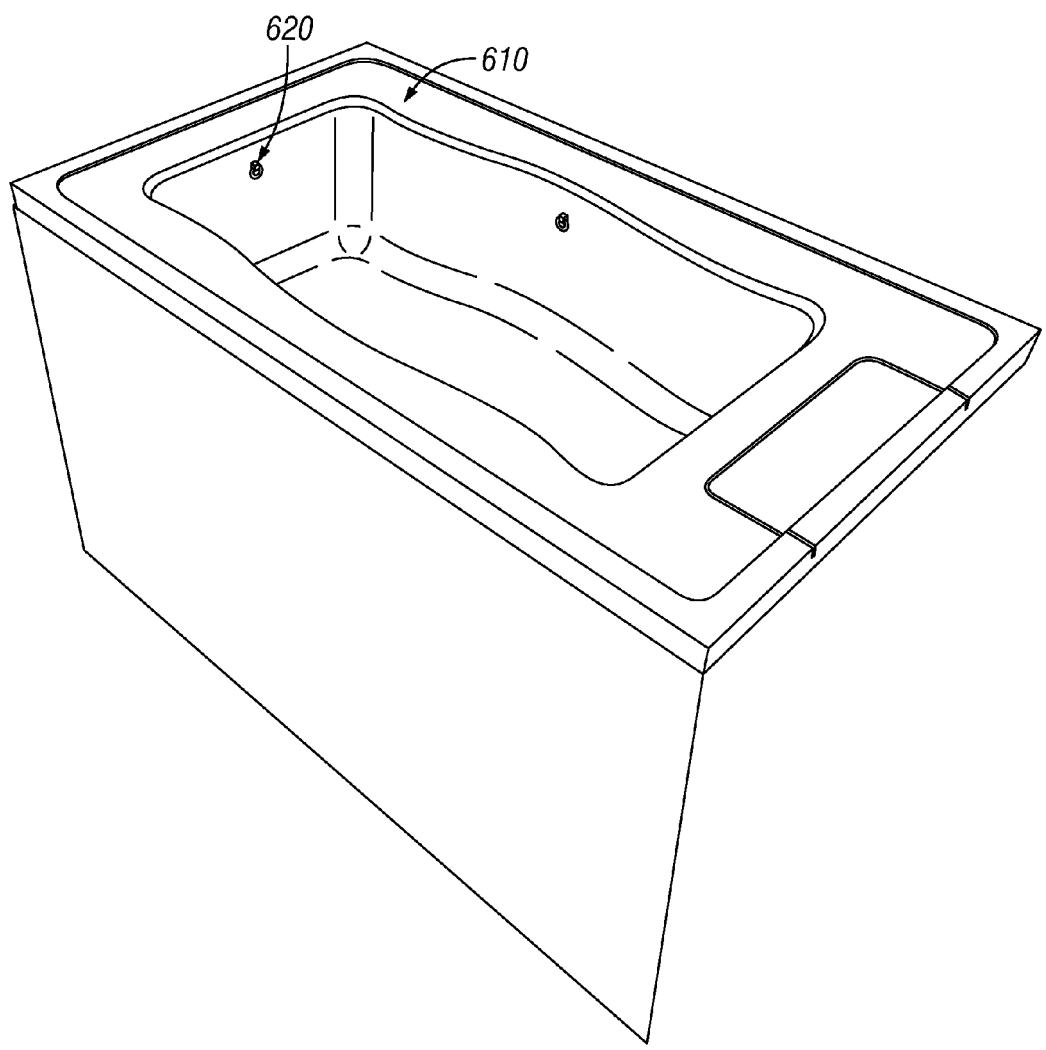
FIG. 22 shows an alternate embodiment of the bathtub insert designed for bathing animals.

FIG. 22 shows an alternate embodiment of the bathtub insert designed for bathing animals. The essential elements of the animal bathing insert are the same as the embodiments described above. However, in this particular embodiment, the horizontal insert panel 610 includes securing rings 620 mounted on the inside walls of the wash basin as shown. These rings can be used to secure an animal in place via leash, harness, etc., to prevent the animal from jumping out of the basin during bathing, as many animals are prone to do.

In addition to using the conversion unit with a conventional bathtub as described above, the present invention can also be used as a stand alone tub.

Figure 23:
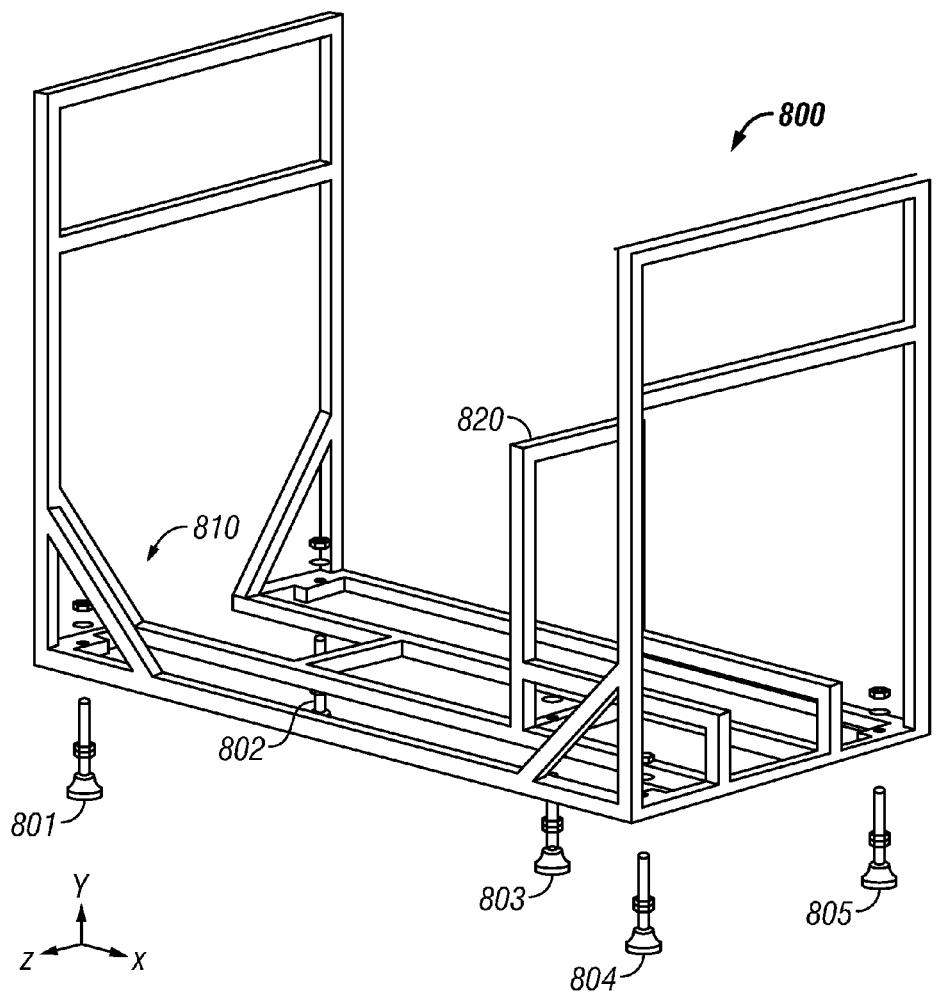
FIG. 23 shows a support frame for a stand alone child bath in accordance with an alternate embodiment of the present invention.

FIG. 23 shows a support frame for a stand alone child bath in accordance with an alternate embodiment of the present invention. The frame 800 allows the insert of the present invention to be used as a stand alone bath without being mounted on top of a conventional bathtub. This stand alone frame 800 can be used with the molded insert shown in FIG. 4, the horizontal panel 310 and front panel 350 in FIG. 11, and the animal bath insert in FIG. 22. The frame 800 includes a support member 820 for the wash basin and five adjustable leveling feet 801-805 allow the height of the frame 800 to be adjusted.

Figure 5:
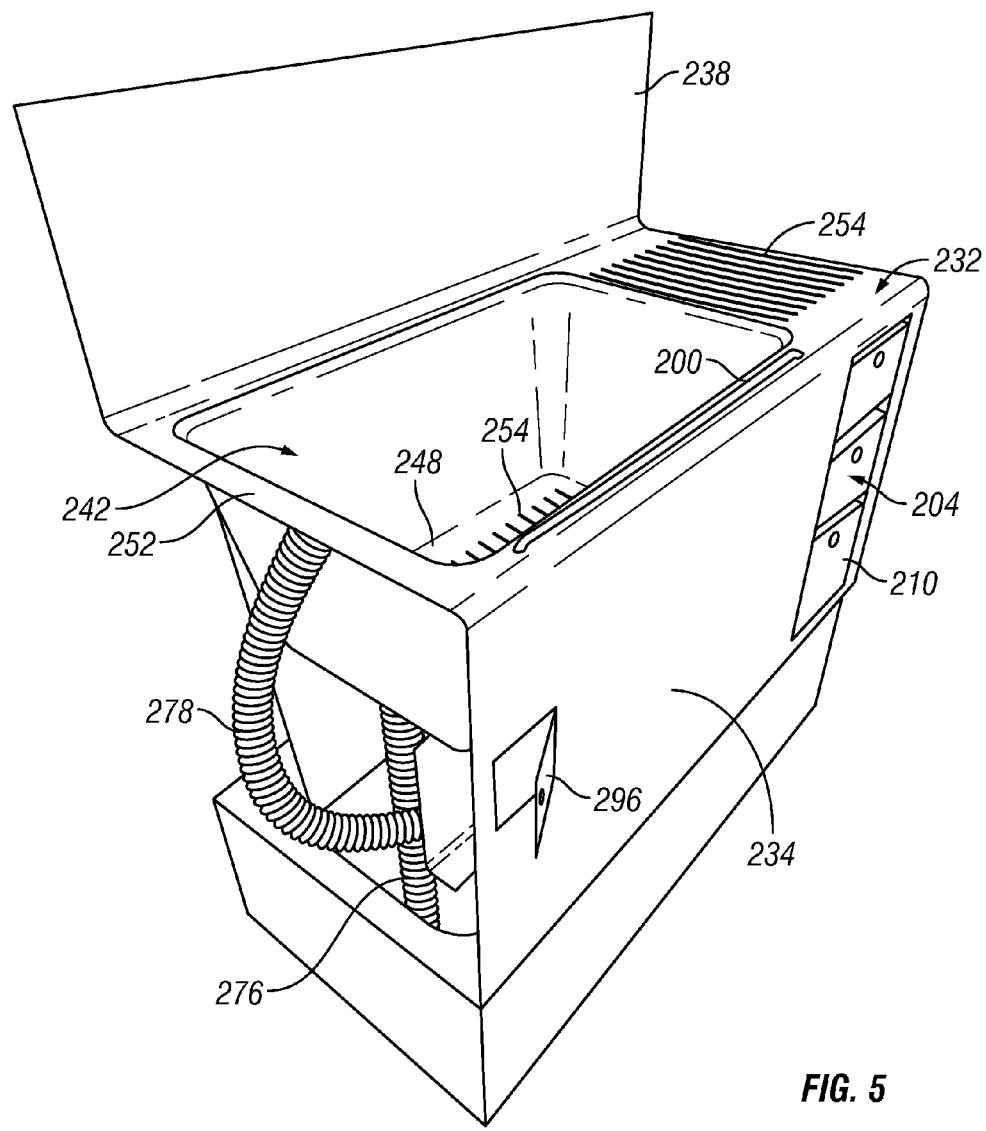
FIG. 5 is a reverse perspective view of the embodiment shown in FIG. 4.

When used as a stand alone bath, the drains of the insert basin can be connected directly to plumbing via hoses such as hoses 276, 278 shown in FIG. 5 in lieu of draining into a convention tub. Similarly, the wash basin in the insert can be filled via a hose such as hose 282 shown in FIG. 6 connected a wall faucet in lieu of a bathtub faucet or showerhead. Access to wall plumbing can be facilitated by the cut out 810 in the frame 800.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A child bath, comprising:
   (a) A molded horizontal top panel that includes a wash basin, wherein the wash basin holds an equal or lesser volume of water than a conventional bathtub and the horizontal top panel has the wash basin molded therein;
   (b) a molded vertical front panel, wherein the molded vertical front panel fully covers a front side of the wash basin and, when positioned on a conventional bathtub, at least partially covers a front side of a conventional bathtub; and
   (c) a support frame,
   wherein the support frame comprises a support arm in contact with a bottom of the wash basin, the support arm providing support to the bottom of the wash basin and the support frame providing structural support to the vertical front panel so that when the child bath is positioned on a conventional bathtub, the support frame contacts a bottom of an interior of conventional bathtub, and the horizontal top panel is held over a top of the conventional bathtub to allow an adult to stand next to the child bath while bathing a child.

2. The child bath according to claim 1, wherein the basin in the horizontal top panel is shallower than a conventional bathtub.

3. The child bath according to claim 1, wherein the support frame holds the horizontal top panel at a height higher than that of a conventional bathtub.

4. The child bath according to claim 1, wherein the vertical front panel features a decorative design.

5. The child bath according to claim 4, wherein the decorative design on the vertical front panel simulates the side of a vehicle and incorporates three-dimensional features.

6. The child bath according to claim 1, wherein the wash basin in the horizontal top panel has a drain for draining the child bath.

7. The child bath according to claim 1, further comprising a removable cover for removable positioning so that the top surface of the horizontal panel is useable as a table.

8. The child bath according to claim 1, wherein the horizontal top panel further comprises a flat work surface area adjacent to the wash basin.

9. The child bath according to claim 8, further comprising a removable diaper changing pad that fits on said flat work surface area adjacent to the wash basin.

10. The child bath according to claim 1, further comprising:
    a swinging door in the vertical front panel; and
    a disposal bin mounted to the inside surface of said swinging door, wherein the disposal bin is hidden from view when the swinging door is closed.

11. The child bath according to claim 1, further comprising a removable foam seat back that fits within the wash basin in the horizontal top panel.

12. The child bath according to claim 1, wherein the height of the support frame is adjustable.

13. The child bath according to claim 1, wherein the wash basin in the horizontal top panel further comprises a variable molded profile that varies according to the following parameters:
    length;
    depth;
    presence of a molded seat in the wash basin and location of said seat; and
    presence of a molded soap/shampoo shelf.

14. The child bath according to claim 1, wherein the vertical front panel is configured to be removably secured to the horizontal top panel.

15. The child bath according to claim 1, wherein the vertical front panel is configured to provide structural stability to the child bath.

16. The child bath according to claim 15, wherein the molded vertical panel is configured to prevent the child bath from tipping over.

17. A child bath, comprising:
    (a) A molded top panel that includes a wash basin, wherein the wash basin holds an equal or lesser volume of water than a conventional bathtub;
    (b) a front panel, wherein the front panel fully covers a front side of the wash basin and at least partially covers a front side of a conventional bathtub when positioned on the conventional bathtub; and
    (c) a support frame that provides structural support to the molded top panel so that when the child bath is positioned over a conventional bathtub, the molded top panel is held above a top of the conventional bathtub, wherein the support frame allows the child bath to accommodate different bathtub sizes, has adjustable feet positioned to support the frame and the wash basin of the molded top panel, when positioned over a conventional bathtub, within the conventional bathtub, has adjustable U-shaped brackets configured to tighten against a wall of the conventional bathtub to secure the U-shaped brackets to a wall of the conventional bathtub and comprises a support arm, the support arm configured to provide support to a bottom of the wash basin.

18. The child bath according to claim 17, wherein the molded top panel is a horizontal panel and the molded front panel is a vertical panel.

19. The child bath according to claim 17, wherein the support frame comprises an upper frame section, the support arm and a lower frame section configured to support the upper frame section and the molded top panel above a bathtub.

20. The child bath according to claim 19, wherein the lower frame section includes leveling feet for contacting a bottom surface of an interior of a bathtub and providing height adjustability and the U-shaped brackets comprise an adjustable knob for securing the U-shaped brackets to a wall of a bathtub.

21. The child bath according to claim 17, wherein the basin is a molded insert in the molded top panel.

22. A child bath, comprising:
(a) A horizontal top panel that includes a wash basin, wherein the wash basin holds an equal or lesser volume of water than a conventional bathtub and the horizontal top panel has the wash basin molded therein is a molded insert;
(b) a vertical front panel, wherein the vertical front panel fully covers a front side of the wash basin and at least partially covers a front side of a conventional bathtub when positioned on the conventional bathtub; and
(c) a support frame that provides structural support to the horizontal top panel so that when the child bath is positioned on a conventional bathtub, the horizontal top panel is held over a top of the conventional bathtub and the support frame is configured to allow the child bath to accommodate different bathtub sizes,
wherein the support frame comprises an upper frame section, a lower frame section and a support arm configured to provide support to a bottom of the wash basin, wherein when positioned on a convention bathtub, the lower frame contacts the bottom of an interior of the conventional bathtub and the lower frame section contacts the support arm under the bottom of the wash basin to support the upper frame section and the molded top panel above the conventional bathtub.

23. The child bath according to claim 22, wherein the horizontal top panel and the vertical front panel are molded panels.

24. A child bath, comprising:
(a) a horizontal top panel that includes a wash basin, wherein the wash basin holds an equal or lesser volume of water than a conventional bathtub and the horizontal top panel has the wash basin molded therein;
(b) a molded vertical front panel, wherein the molded vertical front panel fully covers a front side of the wash basin and at least partially covers a front side of a conventional bathtub when positioned on the conventional bathtub; and
(c) a support frame that provides structural support to the basin and the vertical front panel so that when the child bath is positioned on a conventional bathtub, the support frame contacts a bottom of an interior of the conventional bathtub and a bottom of the basin and the horizontal top panel is held over a top of the conventional bathtub to allow an adult to stand next to the child bath while bathing a child;
wherein the molded vertical front panel is configured to be removably secured to the horizontal top panel.

25. The child bath according to claim 24, wherein the molded vertical front panel is configured to provide structural support to the child bath.

26. The child bath according to claim 24, wherein the molded vertical panel is configured to prevent the child bath from tipping over.

27. The child bath according to claim 24 wherein the support frame comprises a support arm configured to provide support to a bottom of the basin.

28. The child bath according to claim 27 wherein the support frame comprises an upper frame section and a lower frame section, the upper frame section comprising the support arm and the lower frame section contacts a bottom of an interior of the conventional bathtub and the lower frame section supports the upper frame section and the molded top panel above the conventional bathtub.

* * * * *